(12) United States Patent
Daimaru

(10) Patent No.: US 12,534,037 B2
(45) Date of Patent: Jan. 27, 2026

(54) OCCUPANT PROTECTION APPARATUS

(71) Applicant: SUBARU CORPORATION, Tokyo (JP)

(72) Inventor: Shohei Daimaru, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 126 days.

(21) Appl. No.: 18/366,810

(22) Filed: Aug. 8, 2023

(65) Prior Publication Data

US 2024/0075897 A1 Mar. 7, 2024

(30) Foreign Application Priority Data

Sep. 3, 2022 (JP) .................................. 2022-140417

(51) Int. Cl.
*B60R 21/0136* (2006.01)
*B60R 21/0134* (2006.01)

(52) U.S. Cl.
CPC ...... *B60R 21/0136* (2013.01); *B60R 21/0134* (2013.01)

(58) Field of Classification Search
CPC .......................... B60R 21/0136; B60R 21/0134
See application file for complete search history.

(56) References Cited

U.S. PATENT DOCUMENTS

| | | | | |
|---|---|---|---|---|
| 7,625,006 B2 * | 12/2009 | Foo | ................... | B60R 21/01536 701/45 |
| 2003/0111287 A1 * | 6/2003 | Enomoto | .............. | B60R 21/013 180/274 |
| 2008/0258887 A1 * | 10/2008 | Gelberi | ............... | B60R 21/0136 340/436 |
| 2012/0191303 A1 * | 7/2012 | Bullinger | ............ | B60R 21/0134 701/45 |
| 2013/0184941 A1 * | 7/2013 | Freienstein | ......... | B60R 21/0134 701/45 |
| 2013/0300555 A1 * | 11/2013 | Sickon | .................... | B60R 22/00 340/457.1 |
| 2016/0082912 A1 * | 3/2016 | Yoon | ....................... | B60R 21/01 701/45 |
| 2020/0339054 A1 * | 10/2020 | Cho | ........................ | B60R 21/23 |

FOREIGN PATENT DOCUMENTS

| | | |
|---|---|---|
| JP | 2005-145179 A | 6/2005 |
| JP | 4144538 B2 | 9/2008 |

* cited by examiner

*Primary Examiner* — Kurt Philip Liethen
(74) *Attorney, Agent, or Firm* — Rimon P.C.

(57) ABSTRACT

An occupant protection apparatus, to be applied to a vehicle, includes a contact estimator, a contact detector, an irreversible restrainer, and a control processor. The irreversible restrainer irreversibly restrains an occupant of the vehicle. The control processor controls an operation of the irreversible restrainer based on a signal from the contact estimator or the contact detector. The contact detector includes first and second contact detection units that detect the contact in a pre-crush zone and in a crushable zone, respectively. The control processor causes, when an estimation signal from the contact estimator is acquirable, the irreversible restrainer to operate based on a detection signal from the first contact detection unit. The control processor causes, when the estimation signal from the contact estimator is unacquirable, the irreversible restrainer to operate based on a detection signal from the second contact detection unit while referring to the estimation signal.

10 Claims, 4 Drawing Sheets

OCCUPANT PROTECTION APPARATUS

CROSS-REFERENCE TO RELATED APPLICATIONS

The present application claims priority from Japanese Patent Application No. 2022-140417 filed on Sep. 3, 2022, the entire contents of which are hereby incorporated by reference.

BACKGROUND

The disclosure relates to an occupant protection apparatus.

Nowadays, a vehicle is equipped with an occupant protection apparatus typified by a seat belt or an air bag that restrains and protects an occupant upon contact of the vehicle, and such an occupant protection apparatus is advancing day by day in terms of performance.

Typically, upon frontal contact of a vehicle, yawing behavior including a large amount of right-left swinging of the vehicle may occur. When the vehicle comes into frontal contact with a hard object, strong deceleration may be caused.

In such a case, an occupant in a vehicle compartment can move in a right-left direction, which can lead to second contact in which the occupant comes into hard contact with an interior of the vehicle compartment. In order to reduce such a kind of contact, a device such as an air bag tends to be increased in size, in anticipation of various kinds of behavior of the occupant.

In an existing contact impact detection system, however, an increase in size of an air bag is making it difficult to be prepared for contact of an occupant in a state where the air bag is fully deployed.

To address such an issue, desired may be a sensing system that makes it possible to be prepared for receiving an occupant with the air bag being fully deployed, whatever body shape the occupant has and whatever sitting attitude the occupant has.

As such a kind of an occupant protection apparatus, disclosed is a technique that includes: a forward monitoring radar, a side monitoring radar, an accelerometer for frontal contact, and an accelerometer for side contact that are coupled to a control unit and detect or estimate contact; a motor drive retractor and an active pad that are configured to reversibly restrain an occupant; and an air bag and a side air bag that are configured to irreversibly restrain the occupant. An operating timing determination part of the control unit determines reliability of estimation of contact by the radar. Based on the determined reliability, the operating timing determination part of the control unit changes priority of operations of the motor drive retractor and the active pad and thereby control the operations. For example, reference is made to Japanese Unexamined Patent Application Publication (JP-A) No. 2005-145179.

Another disclosed technique compensates, in the following manner, for degradation of system performance due to a decrease in detection accuracy. In a situation where the detection accuracy decreases due to presence of an obstacle at an end of a detection range of a radar device, a control parameter to be used in calculating a correction amount of braking and driving force is changed. Thus, in the situation where the detection accuracy decreases, a control timing for a braking and driving force control is retarded, and a slope of an increase in the correction amount of the braking and driving force is increased. This changes a control method of the braking and driving force control in the situation where the detection accuracy of the radar device decreases. The technique thus compensates for the degradation of the system performance due to the decrease in the detection accuracy. For example, reference is made to Japanese Patent (JP-B) No. 4144538.

SUMMARY

An aspect of the disclosure provides an occupant protection apparatus to be applied to a vehicle. The occupant protection apparatus includes a contact estimator, a contact detector, an irreversible restrainer, and a control processor. The contact estimator is configured to estimate contact of the vehicle. The contact detector is configured to detect the contact of the vehicle. The irreversible restrainer is configured to irreversibly restrain an occupant of the vehicle. The control processor is configured to control an operation of the irreversible restrainer based on a signal from the contact estimator or the contact detector. The contact detector includes a first contact detection unit and a second contact detection unit. The first contact detection unit is configured to detect the contact in a pre-crush zone. The second contact detection unit is configured to detect the contact in a crushable zone. The control processor is configured to, when an estimation signal from the contact estimator is acquirable, cause the irreversible restrainer to operate based on a detection signal from the first contact detection unit. The control processor is configured to, when the estimation signal from the contact estimator is unacquirable, cause the irreversible restrainer to operate based on a detection signal from the second contact detection unit while referring to the estimation signal.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
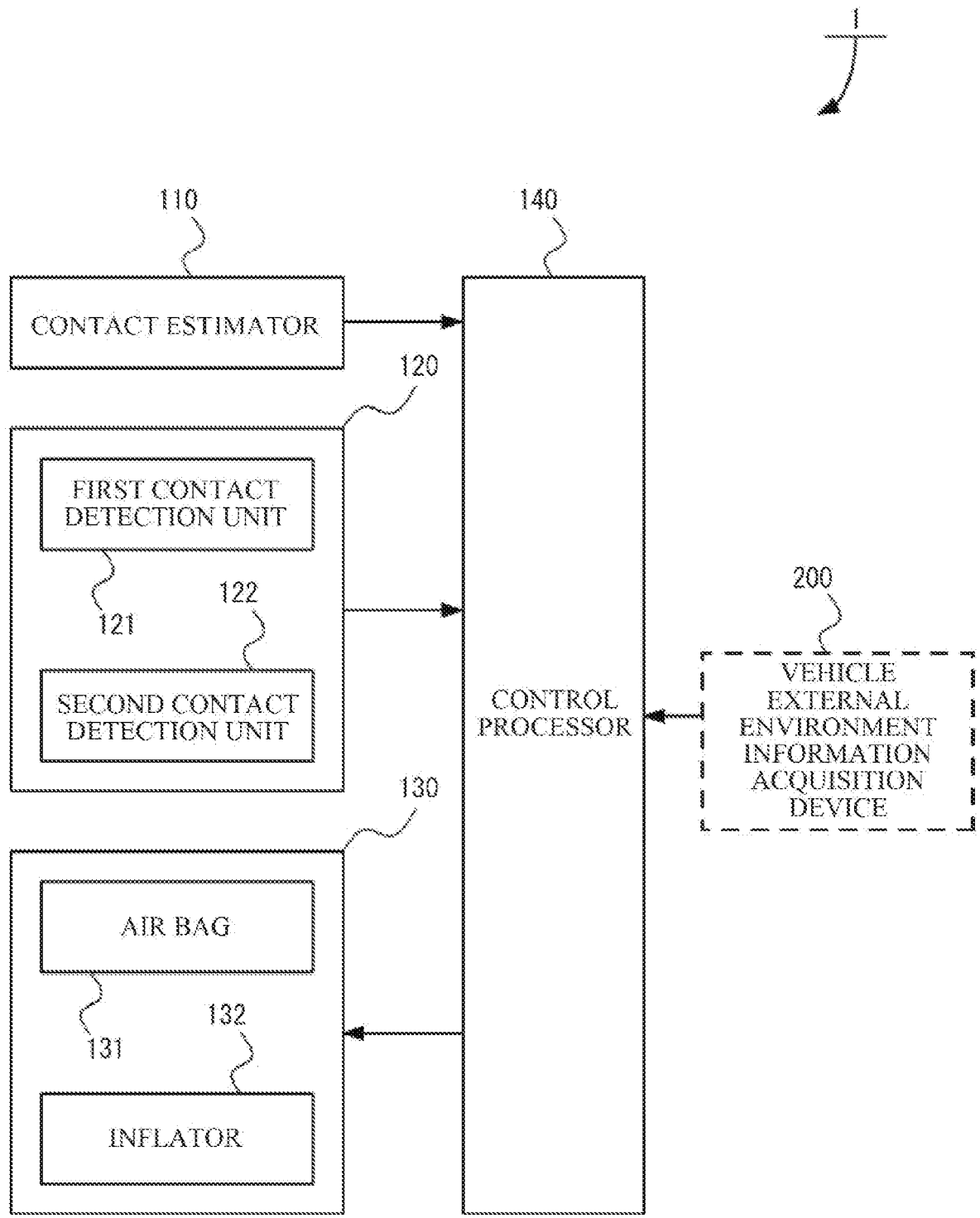
FIG. 1 is a diagram illustrating a configuration of an occupant protection apparatus according to an example embodiment of the disclosure.

A technique disclosed in JP-A No. 2005-145179 relates to an operating timing of a reversible restrainer in a period from a timing of estimation of contact to a vehicle to a timing before actual contact, and does not change an operating timing of an irreversible restrainer that is deployed after the contact.

A technique disclosed in JP-B No. 4144538 evaluates detection accuracy of both a laser radar and a camera, and uses a detected value of the sensor having high detection accuracy performance to perform a vehicle control (including, without limitation, a control of operation reaction force and a control of braking and driving force) corresponding to a risk, but does not change the operating timing of the irreversible restrainer by using the detected value of the sensor having the high detection accuracy performance.

It is desirable to provide an occupant protection apparatus that deploys an irreversible restraining member at an appropriate timing after contact.

Example Embodiment

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. An occupant protection apparatus 1 according to an example embodiment of the disclosure will be described with reference to FIGS. 1 to 4.

Configuration of Occupant Protection Apparatus 1

As illustrated in FIG. 1, the occupant protection apparatus 1 according to the example embodiment includes a contact estimator 110, a contact detector 120, an irreversible restrainer 130, and a control processor 140.

The contact estimator 110 estimates contact of an own vehicle.

The contact estimator 110 may be, for example, a sensor to be used in an advanced driver-assistance systems (ADAS). The contact estimator 110 may include one or more of an imaging device, a light detection and ranging (LiDAR), a millimeter-wave radar, and a ultrasonic sensor.

Non-limiting examples of the imaging device may include a stereo camera. The stereo camera may be able to acquire information regarding a distance from the own vehicle to another vehicle, an obstacle, or a geographic feature in front of the own vehicle. The stereo camera may also be able to easily and accurately identify a kind of an object.

On the other hand, the stereo camera may easily be influenced by a disturbance such as weather, and may not be able to fully operate, for example, in the morning time and in the night time when direct sunlight enters the stereo camera, or under bad weather such as thick fog, heavy rain, or snow.

The LiDAR may be a sensor effective in a middle distance region. The LiDAR may be able to acquire information regarding a distance from the own vehicle to another vehicle, an obstacle, or a geographic feature in front of the own vehicle. The LiDAR may also be able to acquire information to be used in recognizing a three-dimensional shape of the other vehicle, the obstacle, or the geographic feature.

On the other hand, the LiDAR may not be able to fully operate, for example, under bad weather such as thick fog, heavy rain, or snow.

The millimeter-wave radar may be a sensor effective in a long distance region. The millimeter-wave radar may be able to acquire information regarding a distance from the own vehicle to another vehicle, an obstacle, or a geographic feature in front of the own vehicle, or to acquire a relative speed of the own vehicle to the other vehicle in front of the own vehicle.

The millimeter-wave radar may not be easily influenced by a dark environment such as a night environment or inside a tunnel, or by weather such as rain, snow, or fog. On the other hand, the millimeter-wave radar may have a characteristic of being unable to detect a material such as a non-metallic material.

The ultrasonic sensor may be a sensor effective in a short distance region. The ultrasonic sensor may not be easily influenced by weather such as rain, snow, or fog. On the other hand, the ultrasonic sensor may have a characteristic of being unable to detect a material such as a foam material that absorbs sounds.

Information from the contact estimator 110 may be supplied to the control processor 140 which will be described later.

The contact detector 120 detects the contact of the own vehicle.

The contact detector 120 includes a first contact detection unit 121 and a second contact detection unit 122. The first contact detection unit 121 detects contact in a pre-crush zone. The second contact detection unit 122 detects contact in a crushable zone.

The contact detector 120 may include, for example, an acceleration sensor. As the first contact detection unit 121, for example, the acceleration sensor may be disposed in the middle of or at each end of the front bumper in a vehicle-width direction.

The second contact detection unit 122 may include, for example, an acceleration sensor that is disposed at a position at a radiator side and near a frontmost part of the vehicle, and detects longitudinal acceleration caused at a part where the acceleration sensor is attached.

Information from the contact detector 120 may be supplied to the control processor 140 which will be described later.

The irreversible restrainer 130 irreversibly restrains an occupant. For example, the irreversible restrainer 130 may mainly include an air bag 131 and an inflator 132.

The air bag 131 may be a device that uses an inflated bag to absorb kinetic energy of the vehicle or to mitigate an impact.

The inflator 132 may supply a high-pressure gas to the air bag 131. The inflator 132 may instantly ignite a gas generating agent by an ignition device, and thereafter generate a high-pressure nitrogen gas to thereby inflate the air bag 131.

The inflator 132 may operate based on an operation signal from the control processor 140 which will be described later.

The control processor 140 may execute a general control of the occupant protection apparatus 1 by a control program stored in a storage such as an unillustrated read-only memory (ROM).

In the example embodiment, for example, the control processor 140 may analyze determination accuracy in estimating contact based on, for example but not limited to, information from the contact estimator 110 and information from a vehicle external environment information acquisition device 200 present outside the vehicle.

For example, the control processor 140 may combine sensors appropriate for a current vehicle external environment, taking into consideration characteristics of the imaging device, the LiDAR, the millimeter-wave radar, the ultrasonic sensor, etc. included in the contact estimator 110 based on information including, without limitation, weather information and time information acquired from the vehicle external environment information acquisition device 200 present outside the vehicle. The control processor 140 may analyze detection accuracy in estimating contact in the current vehicle external environment based on, for example, determination accuracy in a similar vehicle external environment stored in advance or determination accuracy in a similar vehicle external environment based on data in the past.

When an estimation signal from the contact estimator 110 is acquirable, that is, when sufficient determination accuracy is expectable, the control processor 140 may cause the irreversible restrainer 130 to operate based on a detection signal from the first contact detection unit 121. When the estimation signal from the contact estimator 110 is unacquirable, that is, when sufficient determination accuracy is unexpectable, the control processor 140 may cause the irreversible restrainer 130 to operate based on a detection signal from the second contact detection unit 122 while referring to the estimation signal from the contact estimator 110.

In addition, the control processor 140 may determine presence or absence of contact, a speed of the contact, and a direction of the contact based on a signal from the sensor disposed in the middle of the front bumper in the vehicle-width direction or the sensors at both ends of the front bumper in the vehicle-width direction included in the first contact detection unit 121. The control processor 140 may thereby control which air bag 131 to deploy and how to deploy the air bag 131.

Figure 2:
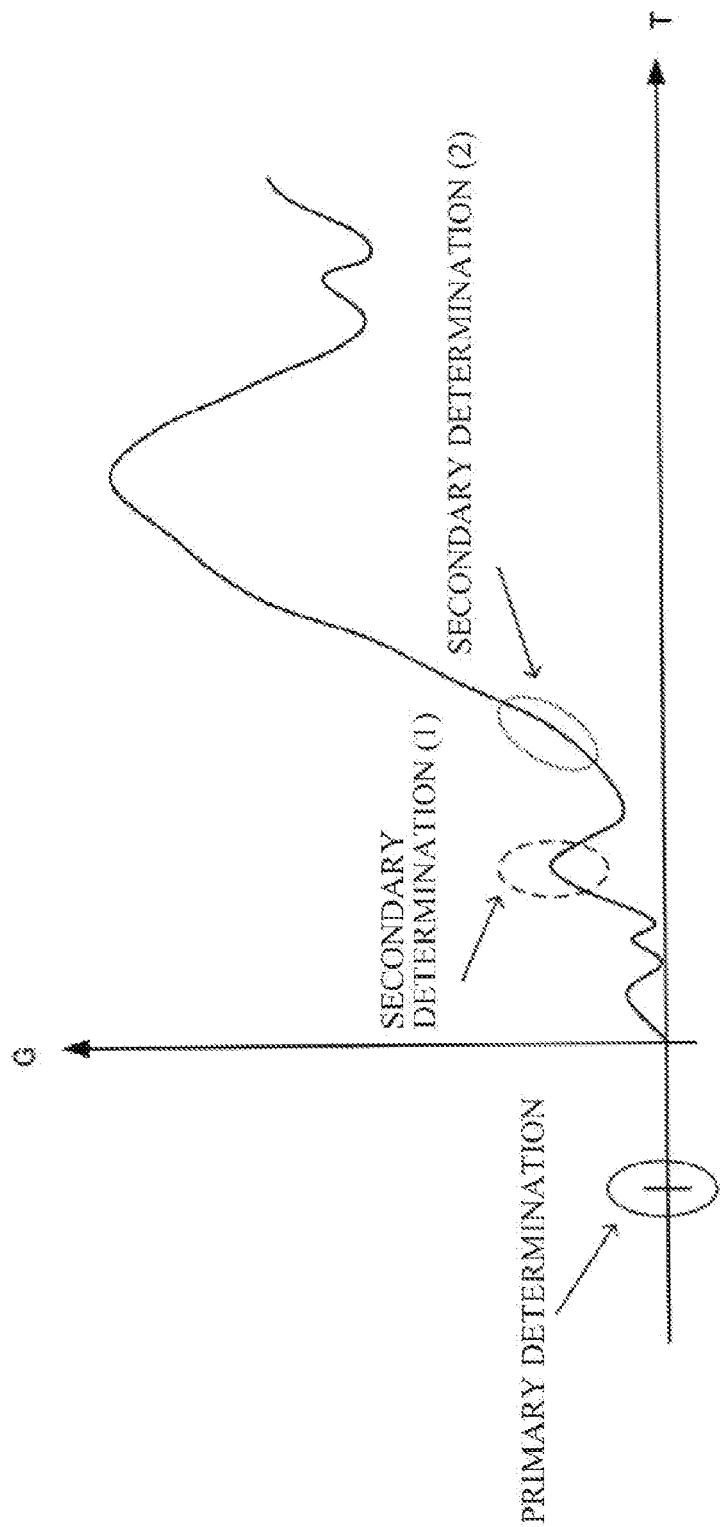
FIG. 2 is a diagram illustrating a relationship between elapse of time from a time point of contact set to zero and acceleration applied on a vehicle according to the example embodiment of the disclosure.

For example, as illustrated in FIG. 2, when the estimation signal from the contact estimator 110 is acquirable, that is, when sufficient determination accuracy is expectable, the control processor 140 may determine, before contact, whether a possibility and a risk of contact are present ("primary determination" (preliminary determination) described in FIG. 2). If the control processor 140 determines that the possibility and the risk of contact are present, the control processor 140 may cause the irreversible restrainer 130 to operate at a time of contact in the pre-crush zone ("secondary determination (1)" described in FIGS. 2 and 3).

Figure 3:
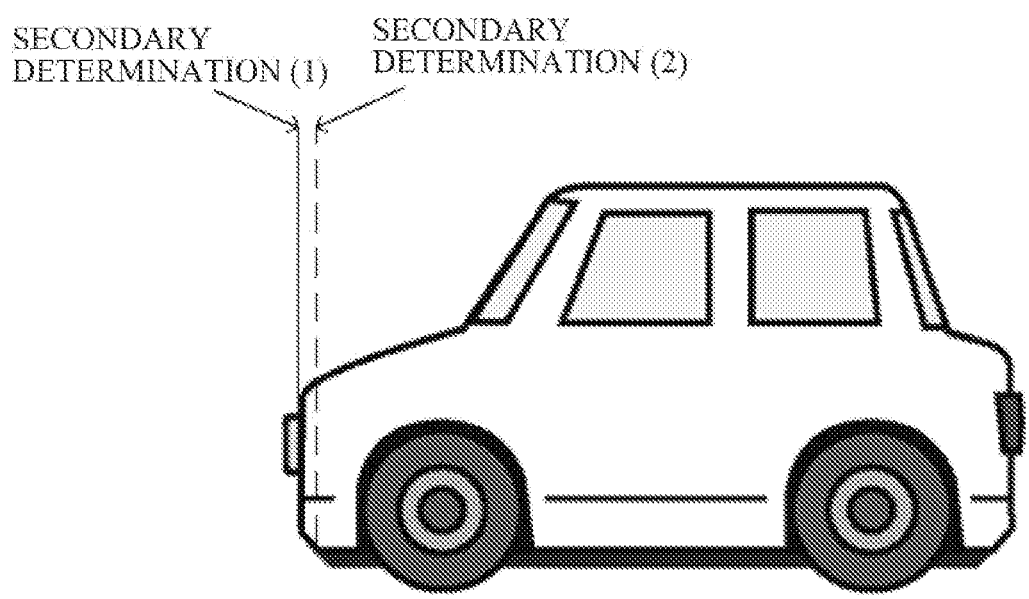
FIG. 3 is a diagram illustrating a pre-crush zone and a crushable zone of the vehicle according to the example embodiment of the disclosure.

For example, as illustrated in FIG. 2, when the estimation signal from the contact estimator 110 is unacquirable, that is, when sufficient determination accuracy is unexpectable, the control processor 140 may cause the irreversible restrainer 130 to operate at a time of contact in the crushable zone ("secondary determination (2)" described in FIGS. 2 and 3).

Process to be Performed by Occupant Protection Apparatus 1

Figure 4:
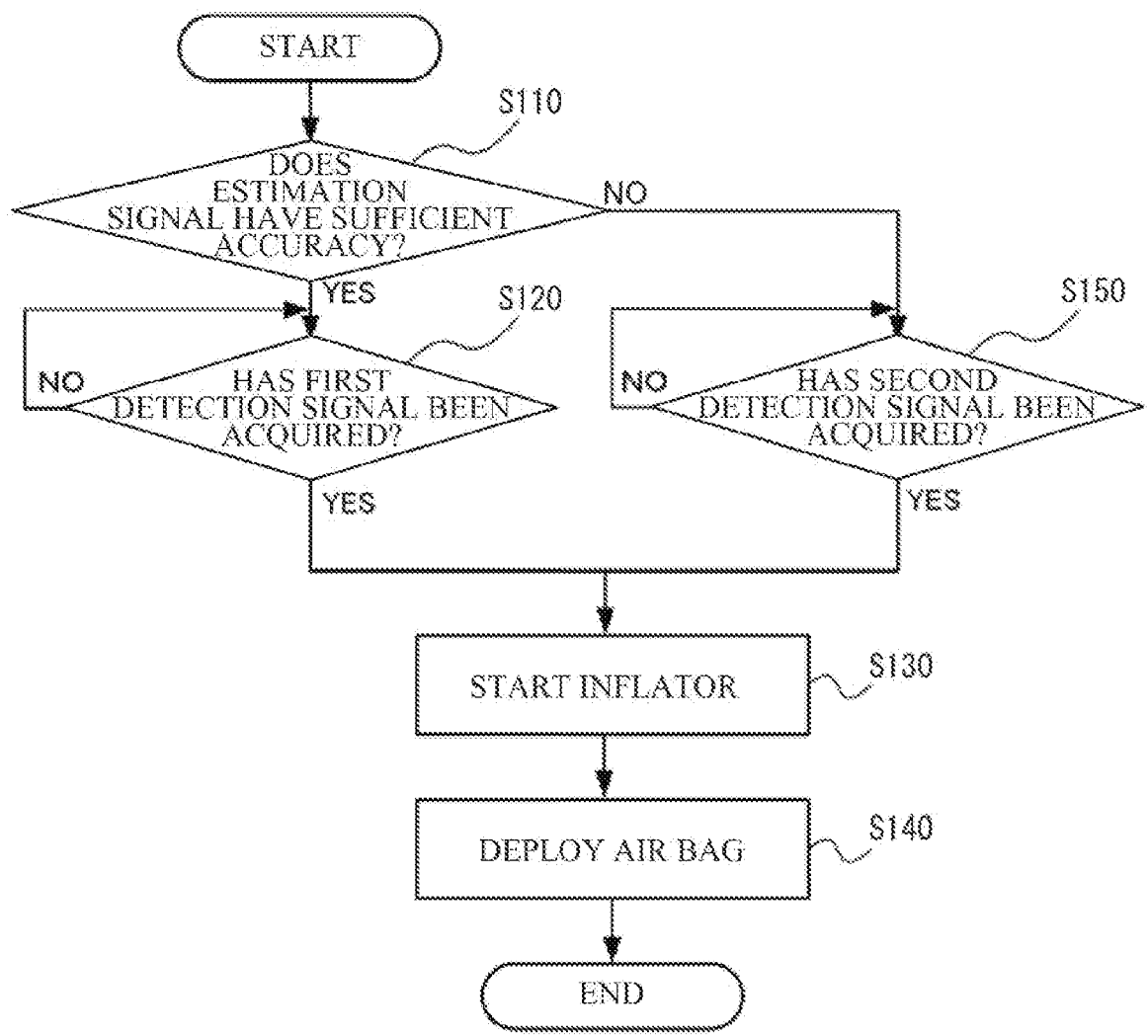
FIG. 4 is a flowchart illustrating a process to be executed by the occupant protection apparatus according to the example embodiment of the disclosure.

A process to be executed by the occupant protection apparatus 1 according to the example embodiment will be described with reference to FIG. 4.

The control processor 140 may combine sensors appropriate for the current vehicle external environment, taking into consideration the characteristics of the imaging device, the LiDAR, the millimeter-wave radar, the ultrasonic sensor, etc. included in the contact estimator 110 based on information including, without limitation, the weather information and the time information acquired from the vehicle external environment information acquisition device 200 present outside the vehicle. The control processor 140 may analyze the current detection accuracy in estimating contact in the current vehicle external environment based on, for example, the determination accuracy in a similar vehicle external environment stored in advance or the determination accuracy in a similar vehicle external environment based on data in the past. The control processor 140 may thus determine whether the estimation signal from the contact estimator 110 is acquirable, that is, whether sufficient determination accuracy is expectable (step S110).

If the control processor 140 determines that sufficient determination accuracy is expectable from the estimation signal from the contact estimator 110 (step S110: YES), the control processor 140 may determine whether a first detection signal has been acquired from the first contact detection unit 121 of the contact detector 120 (step S120).

If the control processor 140 determines that the first detection signal has not been acquired from the first contact detection unit 121 of the contact detector 120 (step S120: NO), the control processor 140 may cause the process to return and shift to a standby mode.

If the control processor 140 determines that the first detection signal has been acquired from the first contact detection unit 121 of the contact detector 120 (step S120: YES), the control processor 140 may send a start signal to the inflator 132 serving as the irreversible restrainer 130 (step S130). The control processor 140 may thereby inflate and deploy the air bag 131 (step S140). Thereafter, the control processor 140 may end the process.

If the control processor 140 determines that sufficient determination accuracy is unexpectable from the estimation signal from the contact estimator 110 in step S110 (step S110: NO), the control processor 140 may determine whether a second detection signal has been acquired from the second contact detection unit 122 of the contact detector 120 (step S150).

If the control processor 140 determines that the second detection signal has not been acquired from the second contact detection unit 122 of the contact detector 120 (step S150: NO), the control processor 140 may cause the process to return and shift to the standby mode.

If the control processor 140 determines that the second detection signal has been acquired from the second contact detection unit 122 of the contact detector 120 (step S150: YES), the control processor 140 may send the start signal to the inflator 132 serving as the irreversible restrainer 130, while referring to the estimation signal from the contact estimator 110 (step S130). The control processor 140 may thereby inflate and deploy the air bag 131 (step S140). Thereafter, the control processor 140 may end the process.

Workings and Example Effects

As described above, the occupant protection apparatus 1 according to the example embodiment includes the contact estimator 110 that estimates contact of the own vehicle, and the contact detector 120 that detects the contact of the own vehicle. The contact detector 120 includes the first contact detection unit 121 and the second contact detection unit 122.

Here, the first contact detection unit 121 may include, for example, the acceleration sensor disposed in the middle or at each of the ends of the front bumper in the vehicle-width direction. The second contact detection unit 122 may be, for example, the acceleration sensor that is disposed at a position at a side member on a right or left side of the vehicle and near the frontmost part of the vehicle, and detects the longitudinal acceleration caused at the part where the acceleration sensor is attached.

That is, the first contact detection unit 121 detects the contact in the so-called pre-crush zone. The second contact detection unit 122 detects the contact in the crushable zone.

When the estimation signal from the contact estimator 110 is acquirable, the control processor 140 causes the irreversible restrainer 130 to operate based on the detection signal from the first contact detection unit 121. When the estimation signal from the contact estimator 110 is unacquirable, the control processor 140 causes the irreversible restrainer 130 to operate based on the detection signal from the second contact detection unit 122 while referring to the estimation signal.

That is, when the estimation signal from the contact estimator 110 is acquirable, the control processor 140 may acquire the estimation signal from the contact estimator 110. Thereafter, in a period up to reception of the detection signal from the first contact detection unit 121, the control processor 140 may more accurately analyze the direction of the contact, the speed of the contact, etc. based on the estimation signals sequentially acquired from the contact estimator 110.

This makes it possible to determine, for example, which irreversible restrainer 130 to operate, and how to control inflation and deployment of the air bag 131. It is therefore possible to appropriately deploy the air bag 131 at an appropriate timing after contact and thereby protect the occupant.

When the estimation signal from the contact estimator 110 is unacquirable, the control processor 140 may determine the presence or absence of contact, the speed of the contact, and the direction of the contact, for example, based on a signal from the sensor disposed at the position near the frontmost part of the vehicle and included in the second contact detection unit 122, based on the detection signal from the second contact detection unit 122, while referring also to the estimation signal from the contact estimator 110. The control processor 140 may thus control which air bag 131 to deploy and how to deploy the air bag 131. It is therefore possible to appropriately deploy the air bag 131 at an appropriate timing after contact and thereby protect the occupant.

Further, the contact estimator 110 of the occupant protection apparatus 1 according to the example embodiment may include one or more of the imaging device, the LiDAR, the millimeter-wave radar, and the ultrasonic sensor. The control processor 140 may determine that the estimation signal from the contact estimator 110 is unacquirable when the control processor 140 determines that determination accuracy in estimating the contact is insufficient based on the signal from the contact estimator 110.

That is, the control processor 140 may combine sensors appropriate for the current vehicle external environment, taking into consideration the characteristics of the imaging device, the LiDAR, the millimeter-wave radar, the ultrasonic sensor, etc. included in the contact estimator 110 based on information including, without limitation, the weather information and the time information acquired from the vehicle external environment information acquisition device 200 present outside the vehicle. The control processor 140 may analyze the detection accuracy in estimating the contact in the current vehicle external environment based on, for example, the determination accuracy in a similar vehicle external environment stored in advance or the determination accuracy in a similar vehicle external environment based on data in the past.

When the estimation signal from the contact estimator 110 is acquirable, that is, when sufficient determination accuracy is expectable, the control processor 140 may cause the irreversible restrainer 130 to operate based on the detection signal from the first contact detection unit 121. When the estimation signal from the contact estimator 110 is unacquirable, that is, when sufficient determination accuracy is unexpectable, the control processor 140 may cause the irreversible restrainer 130 to operate based on the detection signal from the second contact detection unit 122.

It is therefore possible to analyze the determination accuracy of the estimation signal from the contact estimator 110, appropriately deploy the air bag 131 at an appropriate timing after contact, and thereby protect the occupant.

The first contact detection unit 121 of the contact detector 120 of the occupant protection apparatus 1 according to the example embodiment may include, for example, the sensor provided in the middle or at each of the ends of the front bumper in the vehicle-width direction. The control processor 140 may determine the presence or absence of contact, the speed of the contact, and the direction of the contact, based on the signal from the sensor provided in the middle or at each of the ends in the vehicle-width direction.

That is, the control processor 140 may determine the presence or absence of the contact, the speed of the contact, and the direction of the contact, for example, based on a sensor output from the acceleration sensor disposed at the front bumper in the first contact detection unit 121.

This makes it possible to determine, for example but not limited to, which irreversible restrainer 130 to cause to operate, and how to control the inflation and the deployment of the air bag 131. It is therefore possible to appropriately deploy the air bag 131 at an appropriate timing after contact, and thereby protect the occupant.

When the control processor 140 determines that the estimation signal from the contact estimator 110 is acquirable, that is, sufficient determination accuracy is expectable, the control processor 140 may be able to perform the preliminary determination (the primary determination) at that timing. This makes it possible to protect the occupant more safely by performing detailed data processing in relation to determination of the body shape of the occupant, a type of the contact, magnitude of an impact, etc. in addition to analyzing the direction of the contact, the speed of the contact, etc.

An existing typical occupant protection system has had an issue that it is difficult to accurately distinguish between bilaterally symmetrical contact and asymmetrical contact. However, the use of the ADAS sensor in determining the contact as in the example embodiment makes it expectable that information including, without limitation, an instantaneous speed at the contact, a lapped amount of the contact (in a Y-direction and a Z-direction), an angle of the contact, determination regarding an object coming into contact is acquired. Accordingly, further improvement in accuracy of determination of contact is expectable in the future.

The existing typical occupant protection system has also had an issue in a control of time to fire (TTF) based on a difference in speed of contact. However, it is expectable that the improvement in the accuracy of the determination of contact as described above leads to advancement in the control of the TTF.

Modification 1

In the example embodiment, no detailed description has been given of how to deploy the air bag 131. In one example, however, the control processor 140 may adjust a speed of the deployment of the air bag 131 based on information such as the speed of the contact obtainable from the first contact detection unit 121.

In another example, the inflator 132 may be a multistep inflator, and the control processor 140 may cause the air bag 131 to be deployed step by step.

In still another example, the control processor 140 may subject the air bag 131 to primary deployment and thereby cause the air bag 131 to have a deployed shape of a certain degree, and thereafter subject the air bag 131 to secondary deployment.

The control processor 140 executing such a deployment control of the air bag 131 makes it possible to protect the occupant more safely.

Modification 2

In the example embodiment, described is the example where the contact estimator 110 may include one or more of the imaging device, the LiDAR, the millimeter-wave radar, the ultrasonic sensor, etc., and the control processor 140 may combine sensors appropriate for the current vehicle external environment, taking into consideration the characteristics of the above-described sensors. In one example, regarding some sensors having an issue in accuracy among the combined sensors, a threshold for determination of contact may be lowered. The control processor 140 may thus perform comprehensive determination of contact.

The above-described process may be effective, for example, when contact acceleration is small.

In some embodiments, it is possible to implement the occupant protection apparatus 1 of the example embodiment of the disclosure by recording the process to be executed by the control processor 140 on a non-transitory recording medium readable by a computer system, and causing the computer system to load the program recorded on the non-transitory recording medium onto the control processor 140 to execute the program.

The computer system as used herein may encompass an operating system (OS) and a hardware such as a peripheral device.

In addition, when the computer system utilizes a World Wide Web (WWW) system, the "computer system" may encompass a website providing environment (or a website displaying environment).

The program may be transmitted from a computer system that contains the program in a storage device or the like to another computer system via a transmission medium or by a carrier wave in a transmission medium.

The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one or more example embodiments of the disclosure, it is possible to reduce a load on an occupant's body due to contact by deploying an irreversible restraining member at an appropriate timing after the contact.

The control processor 140 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control processor 140 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control processor 140 illustrated in FIG. 1.

The invention claimed is:

1. An occupant protection apparatus to be applied to a vehicle, the occupant protection apparatus comprising:
   a contact estimator configured to estimate contact of the vehicle;
   a contact detector configured to detect the contact of the vehicle;
   an irreversible restrainer configured to irreversibly restrain an occupant of the vehicle; and
   a control processor configured to control an operation of the irreversible restrainer based on a signal from the contact estimator or the contact detector, wherein
   the contact detector comprises a first contact detection unit and a second contact detection unit, the first contact detection unit being configured to detect the contact in a pre-crush zone, the second contact detection unit being configured to detect the contact in a crushable zone,
   wherein the control processor is further configured to:
      determine whether determination accuracy of the contact estimator is greater than or equal to a predetermined value before selecting one of a detection signal from the first contact detection unit and a detection signal from the second contact detection unit for controlling operation of the irreversible restrainer;
      upon determining that the determination accuracy in estimating contact is greater than or equal to the predetermined value, cause the irreversible restrainer to operate based on the detection signal from the first contact detection unit; and
      upon determining that the determination accuracy in estimating contact is less than the predetermined value, cause the irreversible restrainer to operate based on a detection signal from the second contact detection unit.

2. The occupant protection apparatus according to claim 1, wherein the contact estimator comprises one or more of an imaging device, a light detection and ranging, a millimeter-wave radar, and an ultrasonic sensor, and the control processor is configured to analyze the determination accuracy in estimating contact in a current vehicle external environment based on information from the contact estimator and information from a vehicle external environment information outside the vehicle.

3. The occupant protection apparatus according to claim 1, wherein the first contact detection unit comprises a sensor provided at a front bumper, and the control processor is configured to determine presence or absence of the contact, a speed of the contact, and a direction of the contact, based on a signal from the sensor.

4. The occupant protection apparatus according to claim 1, wherein the second contact detection unit comprises a sensor provided at a side member of the vehicle, and the control processor is configured to determine presence or absence of the contact, a speed of the contact, and a direction of the contact, based on a signal from the sensor.

5. The occupant protection apparatus according to claim 2, wherein the contact estimator is configured to determine whether the contact of the vehicle is likely to occur based on a signal from the imaging device, the light detection and ranging, the millimeter-wave radar, or the ultrasonic sensor, and output the estimation signal in response to a determination that the contact of the vehicle is likely to occur.

6. The occupant protection apparatus according to claim 1, wherein the first contact detection unit comprises an acceleration sensor configured to detect a first acceleration and to output a first detection signal when the detected first acceleration is greater than or equal to a first threshold value, and the second contact detection unit comprises an acceleration sensor configured to detect a second acceleration and to output a second detection signal when the detected second acceleration is greater than or equal to a second threshold value.

7. The occupant protection apparatus according to claim 6, wherein the control processor is configured to, when the determination accuracy in estimating contact is greater than or equal to the predetermined value, cause the irreversible restrainer to operate in response to acquiring the first detection signal from the first contact detection unit, and the control processor is configured to, when the determination accuracy in estimating contact is less than the predetermined value, cause the irreversible restrainer to operate only in response to acquiring the second detection signal from the second contact detection unit.

8. The occupant protection apparatus according to claim 2, wherein the control processor is configured to, when the determination accuracy in estimating contact is greater than or equal to the predetermined value, start analyzing a direction of the contact, a speed of the contact based on a signal from the imaging device, the light detection and ranging, the millimeter-wave radar, or the ultrasonic sensor, and control a mode of operation of the irreversible restrainer based on results of the analysis.

9. The occupant protection apparatus according to claim 8 wherein the first contact detection unit comprises an acceleration sensor configure to detect a first acceleration and to output a first detection signal when the detected first acceleration is greater than or equal to a first threshold value, and the control processor is configured to control, based on the results of the analysis, a time from a time when the first detection signal is acquired to a time when the irreversible restrainer is operated.

10. The occupant protection apparatus according to claim 2, wherein the control processor is configured to:

select one or more sensors among the imaging device, the light detection and ranging, the millimeter-wave radar, and the ultrasonic sensor based on weather information and time information; and analyze the determination accuracy in estimating contact using information from the selected sensors.

* * * * *